(12) United States Patent
Binfet et al.

(10) Patent No.: US 8,332,101 B2
(45) Date of Patent: Dec. 11, 2012

(54) METHOD AND APPARATUS FOR DOOR SELECTABLE AUTOMATIC UNLOCKING SENSOR

(75) Inventors: Michael Binfet, Bellefontaine, OH (US); John Sgueglia, Columbus, OH (US)

(73) Assignee: Honda Motor Co., Ltd., Tokyo (JP)

( * ) Notice: Subject to any disclaimer, the term of this patent is extended or adjusted under 35 U.S.C. 154(b) by 576 days.

(21) Appl. No.: 12/423,857

(22) Filed: Apr. 15, 2009

(65) Prior Publication Data

US 2010/0268424 A1 Oct. 21, 2010

(51) Int. Cl.
*G06F 19/00* (2011.01)
*G05B 19/00* (2006.01)

(52) U.S. Cl. .......................................... 701/45; 340/5.72

(58) Field of Classification Search .................... 701/36, 701/45, 59; 180/281, 286, 271; 340/5.72, 340/927
See application file for complete search history.

(56) References Cited

U.S. PATENT DOCUMENTS

| | | | |
|---|---|---|---|
| 2,031,281 A | 2/1936 | Roberts | |
| 3,096,845 A | 7/1963 | Oishei et al. | |
| 3,630,305 A | 12/1971 | Kazaoka | |
| 4,203,039 A | 5/1980 | Pritchard | |
| 4,896,050 A | 1/1990 | Shin-Chung | |
| 6,005,485 A * | 12/1999 | Kursawe et al. | 340/665 |
| 6,188,941 B1 | 2/2001 | Hwang | |
| 6,785,595 B2 | 8/2004 | Kominami et al. | |
| 7,242,282 B2 * | 7/2007 | Pinckney, Sr. | 340/426.28 |
| 7,363,123 B2 | 4/2008 | Terauchi et al. | |
| 7,515,034 B2 * | 4/2009 | Inoue | 340/5.61 |
| 7,555,370 B2 * | 6/2009 | Breed et al. | 701/2 |
| 2001/0022549 A1 | 9/2001 | Mauel et al. | |
| 2002/0161501 A1 * | 10/2002 | Dulin et al. | 701/45 |
| 2002/0171540 A1 * | 11/2002 | Ando et al. | 340/457 |
| 2002/0197976 A1 | 12/2002 | Liu et al. | |
| 2004/0119599 A1 * | 6/2004 | Stevenson et al. | 340/686.1 |
| 2006/0158322 A1 * | 7/2006 | Pinckney | 340/426.28 |
| 2007/0216517 A1 * | 9/2007 | Kurpinski et al. | 340/5.72 |
| 2009/0224879 A1 * | 9/2009 | Nakazawa et al. | 340/5.72 |
| 2011/0093165 A1 * | 4/2011 | Miller et al. | 701/36 |

FOREIGN PATENT DOCUMENTS

| | | |
|---|---|---|
| JP | 51124229 | 10/1976 |
| JP | 02232489 | 9/1990 |
| JP | 05256057 | 10/1993 |

(Continued)

OTHER PUBLICATIONS

'Auto Door Lock'—Tundra Solutions Forum—webpage—www.tundrasolutions.com/forums/4runner/45150-auto-door-lock/ (see attachment).

'Automatic Door Lock Controller'—Dakota Digital—webpage—www.dakotadigital.com/index.cfm/page/ptype=produt/product_id=460/prd460.htm (see attachment).

*Primary Examiner* — Khoi Tran
*Assistant Examiner* — Jason Holloway
(74) *Attorney, Agent, or Firm* — Clifford B. Vaterlaus; Emerson Thomson Bennett

(57) ABSTRACT

A vehicle door lock system may include a control unit for selectively unlocking a door, the control unit having an input for receiving a signal from an occupant detection system, a logic unit for determining whether to send an unlock signal to the door based upon the input, and an output for selectively sending the unlock signal to the door when the automatic door unlock conditions are met.

16 Claims, 10 Drawing Sheets

FOREIGN PATENT DOCUMENTS

| | | |
|---|---|---|
| JP | 2002192977 | 7/2002 |
| JP | 2004156238 | 6/2004 |
| JP | 2004162477 | 6/2004 |
| JP | 2006144365 | 6/2006 |

* cited by examiner

US 8,332,101 B2

METHOD AND APPARATUS FOR DOOR SELECTABLE AUTOMATIC UNLOCKING SENSOR

I. BACKGROUND OF THE INVENTION

A. Field of Invention

This invention pertains to the art of methods and apparatuses related to automatically locking and unlocking vehicle passenger doors and more specifically to methods and apparatus related to automatically locking and unlocking selected vehicle passenger doors.

B. Description of the Related Art

It is well known in the art to provide vehicle passenger doors with an automatic lock system. Current door lock system logic, for example, is used to lock the doors when the driver shifts the transmission out of park. When the driver shifts the transmission back into park, there are a few different known automatic door lock/unlock options: (1) one option unlocks the driver door only; (2) a second option unlocks all the passenger doors; and, (3) a third option does not adjust the locks of any passenger doors—they all remain locked.

While known door lock system logic generally works well for its intended purpose, there are known limitations. One limitation is that additional passenger door lock/unlock options may be desirable. Another limitation is that the understanding required to reprogram the door lock system logic is often lacking. These limitations to known door lock system logic result in customer complaints, higher warranty costs, and potential safety concerns if the wrong lock/unlock option is selected.

Therefore, what is needed is a method and apparatus that senses the condition of the door lock when the transmission is shifted out of park and returns the lock to the sensed condition when the transmission is shifted back into park.

II. SUMMARY OF THE INVENTION

According to one embodiment of this invention, a door unlocking system includes an occupant detection system mounted to the frame for determining whether the seat adjacent the door is occupied, and a control unit mounted to the frame having an integrated circuit for selectively unlocking the door. The control unit has an input for receiving a signal from the occupant detection system when the transmission is changed from a park condition to a moving condition, a logic unit for determining whether to send an unlock signal to the door based upon the input, and an output for selectively sending the unlock signal to the door when the transmission is changed from the moving condition to the park condition.

According to another embodiment of this invention, a door unlocking system includes a control unit mounted to the frame having an integrated circuit for selectively unlocking the door. The control unit has an input for receiving a signal from the door identifying whether the door is in the locked condition or the unlocked condition when the transmission is changed from the park condition to the moving condition, a logic unit for determining whether to send an unlock signal to the door based upon the input, and an output for selectively sending the unlock signal to the door when the transmission is changed from the moving condition to the park condition.

According to another embodiment of this invention, a vehicle includes a transmission having a park condition and a moving condition, a door having a lock, and a seat positioned adjacent the at least one door. The method of operating a locking system for the vehicle includes detecting an occupancy condition of the seat, detecting the locked condition of the lock when the transmission is moved from the park condition, locking the door while the transmission is placed in the moving condition, and determining whether to unlock the lock when the transmission is moved back to the park condition based on the occupancy condition of the seat and the condition of the lock when the transmission was moved from the park condition. An occupant detection system mounted to the frame detects the occupancy condition of the seat. A control unit having an integrated circuit mounted to the frame detects the locked condition of the lock and determines whether to unlock the lock.

One advantage of this invention is that a user can individually set which passenger doors are unlocked when the transmission is shifted back into park.

Another advantage of this invention is that the passenger doors can be locked/unlocked based on seat occupancy.

Still other benefits and advantages of the invention will become apparent to those skilled in the art to which it pertains upon a reading and understanding of the following detailed specification.

III. BRIEF DESCRIPTION OF THE DRAWINGS

The invention may take physical form in certain parts and arrangement of parts, embodiments of which will be described in detail in this specification and illustrated in the accompanying drawings which form a part hereof and wherein.

IV. DETAILED DESCRIPTION OF THE INVENTION

Figure 1:
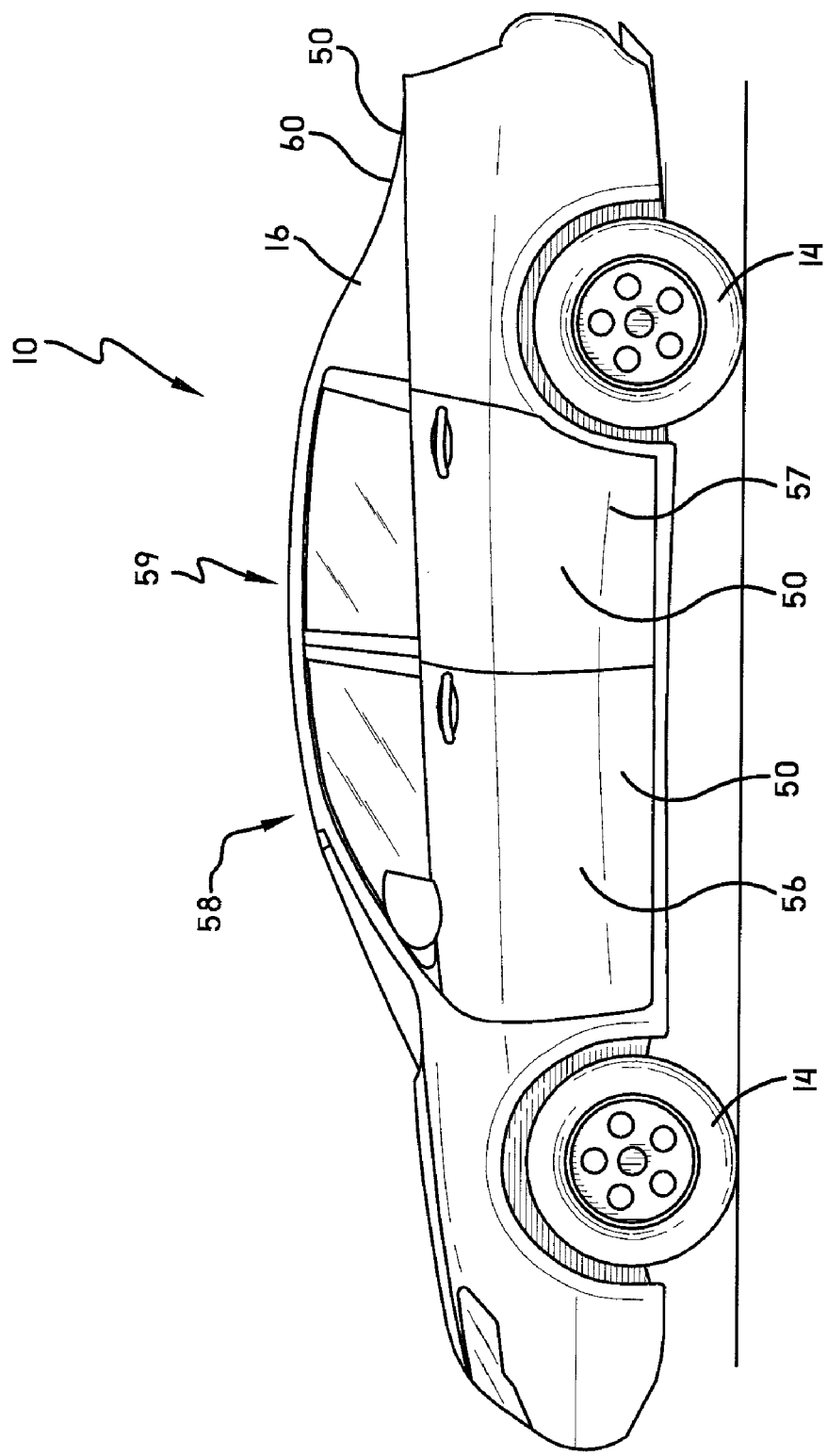
FIG. 1 is a side perspective view of a vehicle.
Figure 2:
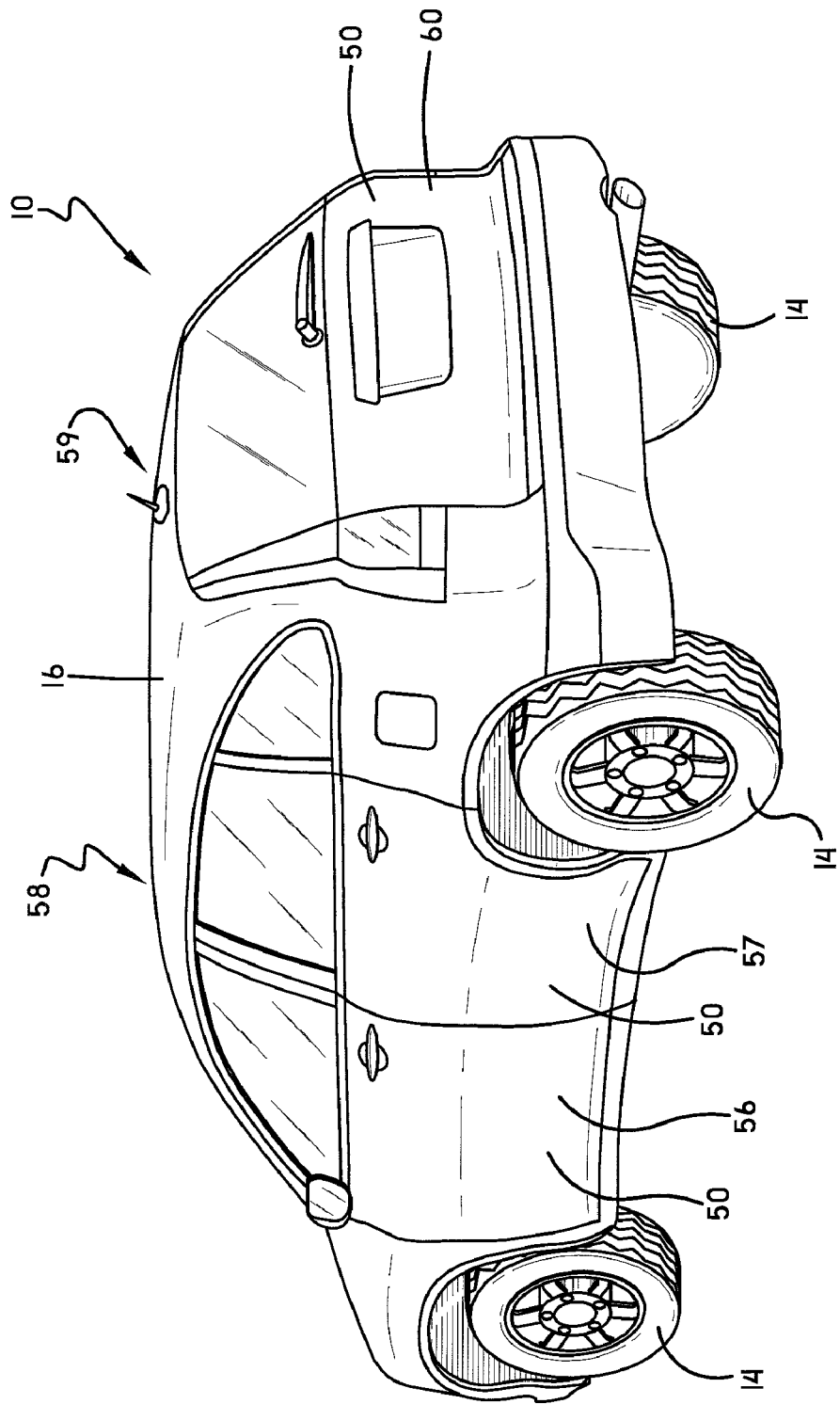
FIG. 2 is a side perspective view of another vehicle showing a rear hatch door.
Figure 3:
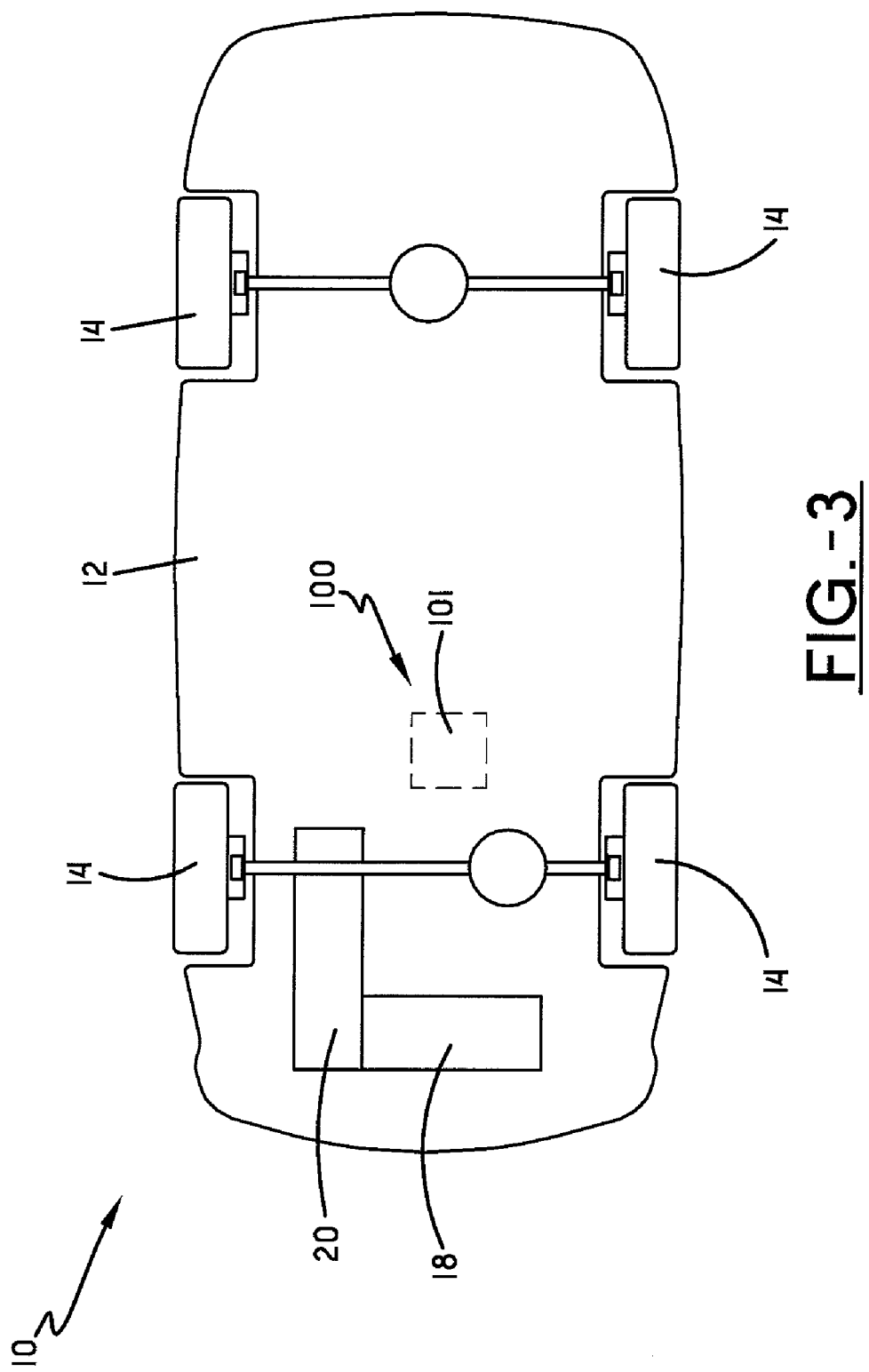
FIG. 3 is a bottom schematic view of a vehicle.

Referring now to the drawings wherein the showings are for purposes of illustrating embodiments of the invention only and not for purposes of limiting the same, and wherein like reference numerals are understood to refer to like components, FIGS. 1-3 show a vehicle 10 that may be equipped with a door lock system 100 according to one embodiment of this invention. While the vehicle 10 shown in FIG. 1 is a sedan, and the vehicle shown in FIG. 2 is a sports utility vehicle (SUV), it is to be understood that the door lock system 100 of this invention will work with any vehicle including, for some non-limiting examples, cars, vans, trucks, airplanes, and boats. The vehicle 10 may include a frame 12, one or more ground engaging wheels 14 operatively mounted to the frame 12, a body 16 mounted to the frame 12, and a locomotion source 18 mounted to the frame 12 for use in providing locomotion for the vehicle 10. The locomotion source could be of any type chosen with the sound judgment of a person of skill in the art including, for some non-limiting examples, an internal combustion engine (ICE), an electric motor, and a so called "hybrid" which combines an ICE with an electric motor.

Figure 4:
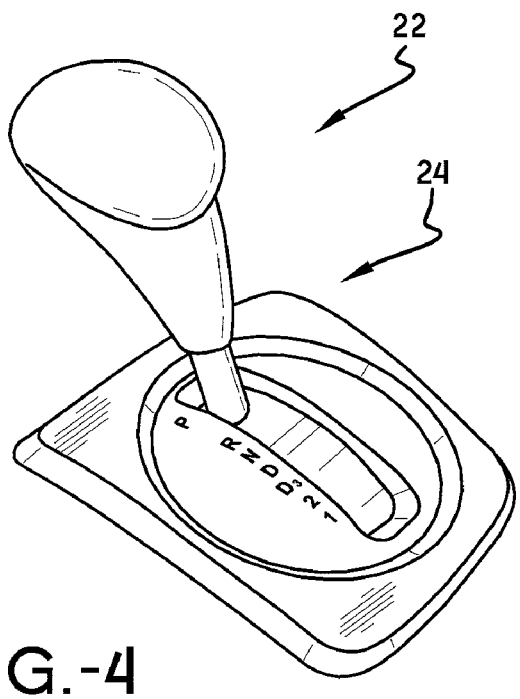
FIG. 4 is a perspective view of a transmission shift lever shown in a park "P" position.
Figure 5:
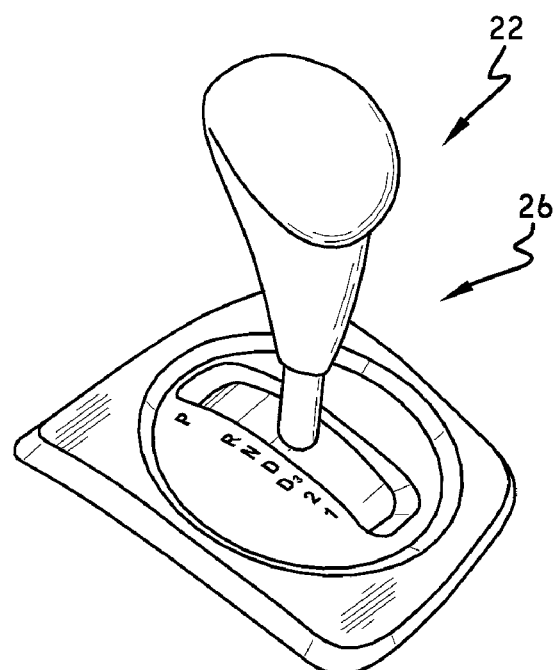
FIG. 5 is a perspective view of a transmission shift lever shown in a drive "D" position.

With reference now to FIGS. 3-5, the vehicle 10 may also include a transmission 20 for operatively connecting the locomotion source 18 to at least one wheel 14. The transmission 20 may be an automatic transmission or a manual transmission, as is well known in the art. The automatic transmission 20 may include a transmission shift lever 22 for changing the transmission 20 from a park position 24 (commonly designated with a "P") to a moving position 26 which may include one or more of the following options: reverse (commonly designated with an "R"), neutral (commonly designated with an "N"), drive (commonly designated with a "D"), a specific gear (commonly designated with a "D3" or "L2" or "2" or "1"), or manual shift (commonly designated with an "M" or "S"). It should be noted that other moving options are also possible. The park position 24 maintains the vehicle 10 in a stationary position, while the moving position 26 allows the vehicle to move. Depending on which moving position 26 is selected, the locomotion source 18 acting with the transmission 20 can provide locomotion to the vehicle 10 through at least one wheel 14.

With reference now to FIGS. 1-2 and 6-7, the body 16 may define an interior 30 which may house passengers and/or cargo as is well known in the art. The interior 30 may include the transmission shift lever 22. The interior 30 may include a seat 32 having a seat belt 34. The seat belt 34 may have a male end 36 and a female end 38 for latching the seat belt 34 when the seat 32 is occupied. The female end 38 may include seat belt switch 40, which is in an open condition when the seat belt 34 is unlatched and in a closed condition when the seat belt 34 is latched. The seat 32 may include a weight measurement device 42 for measuring the amount of weight of an object or a person being supported by the seat 32. The interior 30 may include a front driver side seat 44, a rear driver side seat 45, a front passenger side seat 46, and a rear passenger side seat 47.

Figure 6:
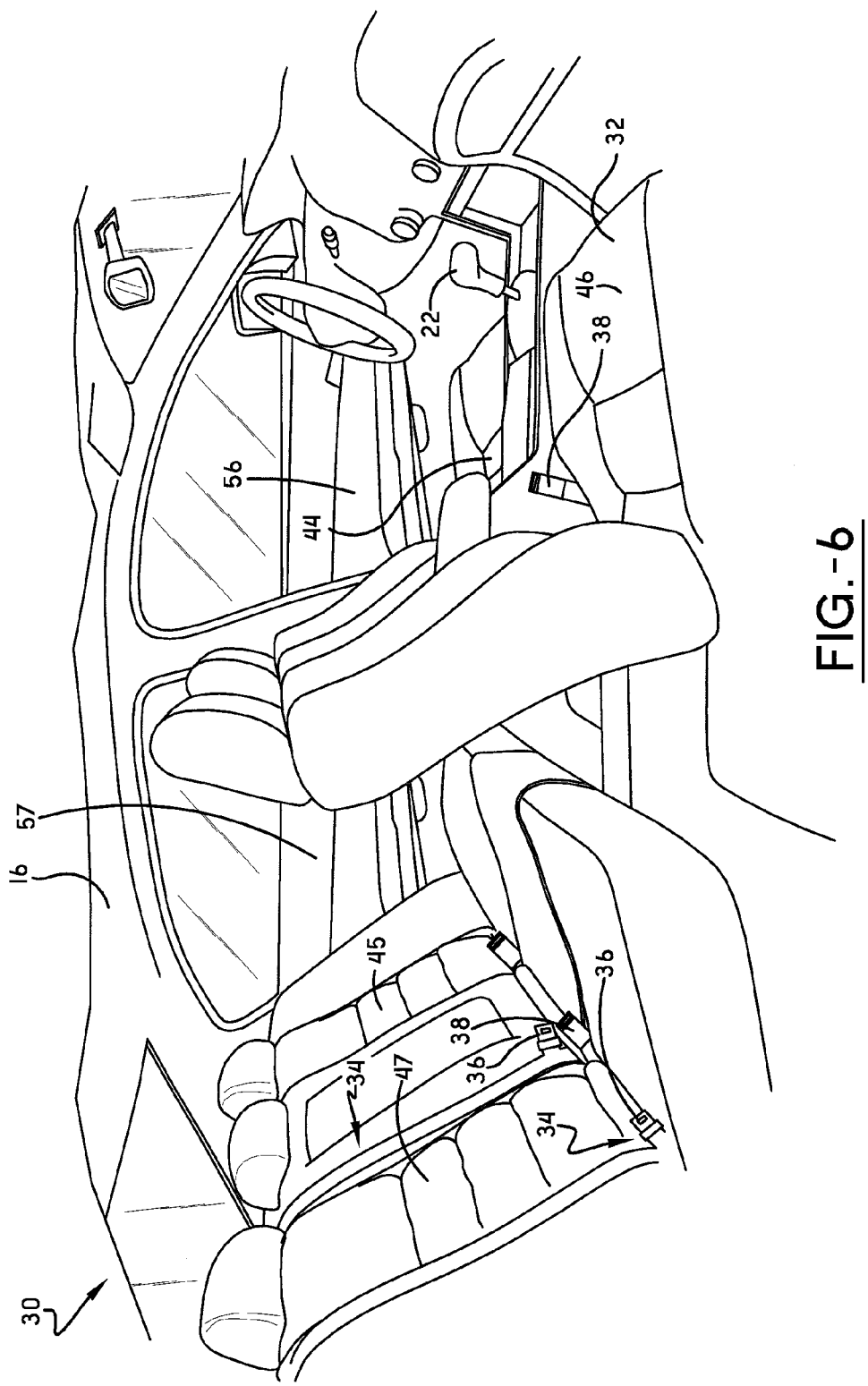
FIG. 6 is a side perspective view of an interior of a vehicle.
Figure 7:
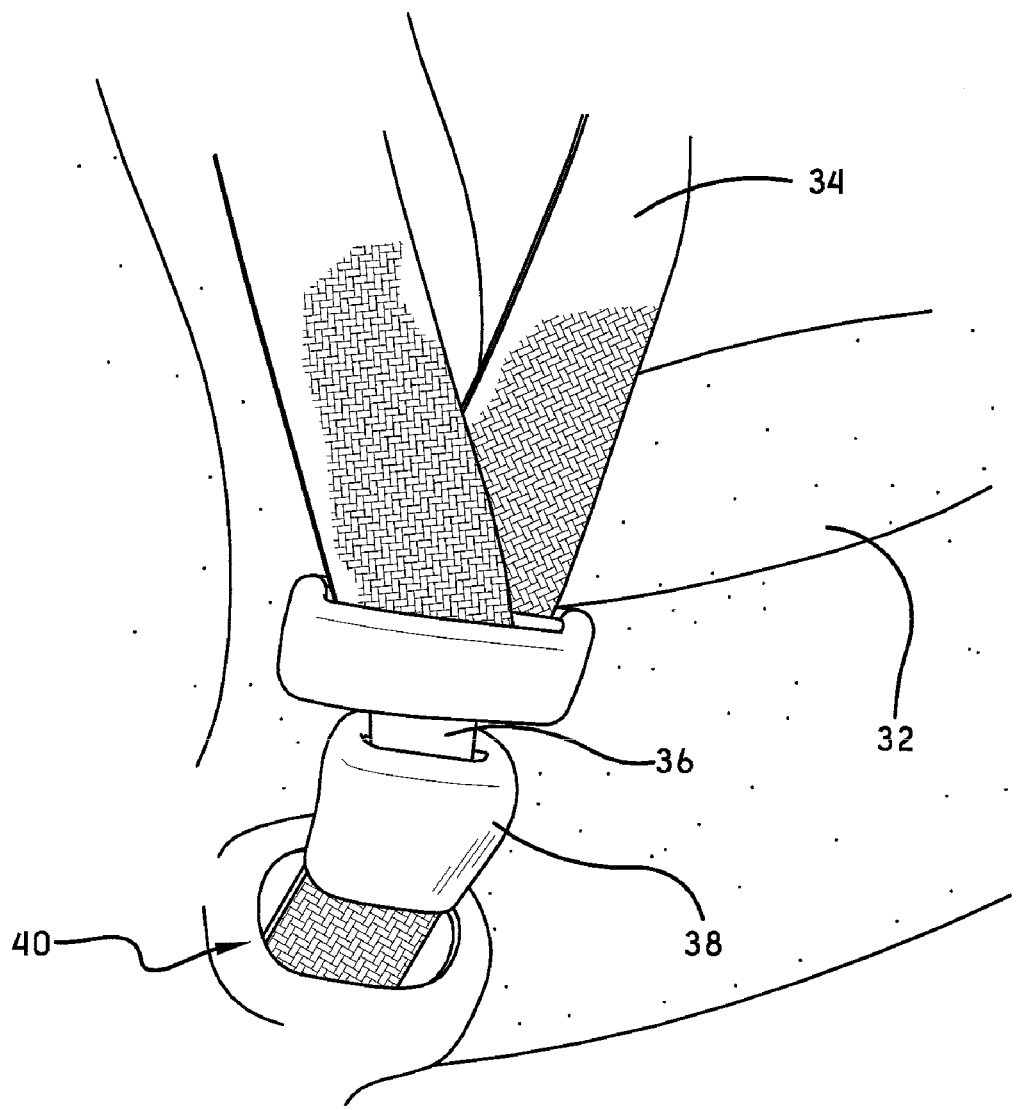
FIG. 7 is a perspective close-up view of a fastened seat belt.

With reference now to FIGS. 1-2 and 6, the vehicle 10 may include at least one door 50 for access to at least a portion of the interior 30 of the vehicle 10. The door 50 can be one of many access openings on a vehicle including, but not limited to, a front driver side door, a front passenger side door, a rear driver side door, a rear passenger side door, a driver side sliding door, a passenger side sliding door, a tailgate, a glass hatch, or a trunk lid. The vehicle 10 may have a front driver side door 56, a rear driver side door 57, a front passenger side door 58, a rear passenger side door 59, and a trunk or rear hatch door 60. The front driver side door 56 may be adjacent the front driver side seat 44. The rear driver side door 57 may be adjacent the rear driver side seat 45. The front passenger side door 58 may be adjacent the front passenger side seat 46. The rear passenger side door 59 may be adjacent the rear passenger side seat 47.

Figure 9:
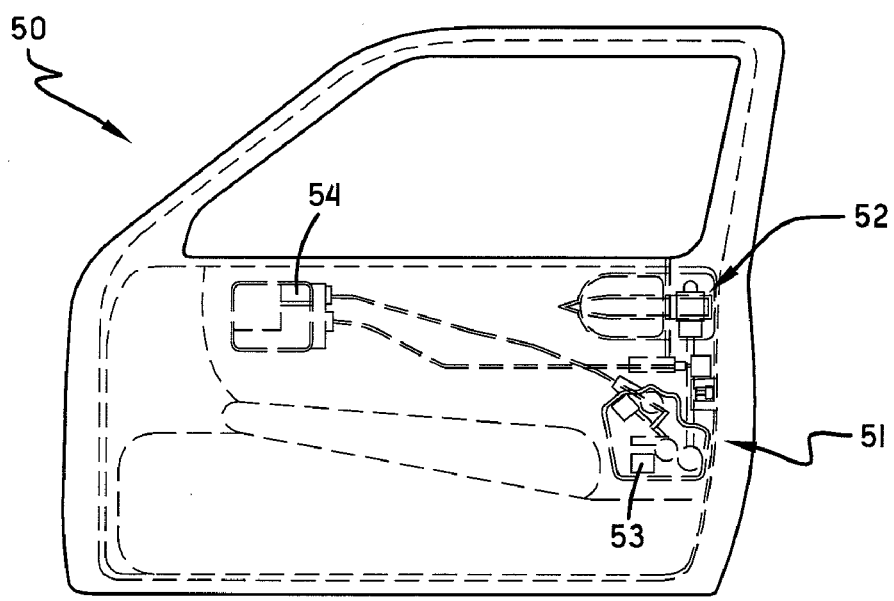
FIG. 9 is a side view of a passenger door.

With reference now to FIG. 9, each door 50 may include a lock mechanism 51. The lock mechanism 51 has a locked condition for prohibiting the door 50 from opening and an unlocked condition for allowing the door 50 to open. The lock mechanism 51 can be actuated from the interior by a button, a switch, or some other manually operable locking device 54 on the door 50. The lock mechanism 51 can be actuated from outside the vehicle by a key lock 52, a remote key fob (not shown), or by a door mounted touch pad (not shown). The door 50 may include an electrically powered actuator 53, which can move the lock mechanism 51 between its locked and unlocked positions. The lock actuator 53 may be a solenoid, a motor drive, or any other actuator mechanism chosen by one with ordinary skill in the art.

Figure 8:
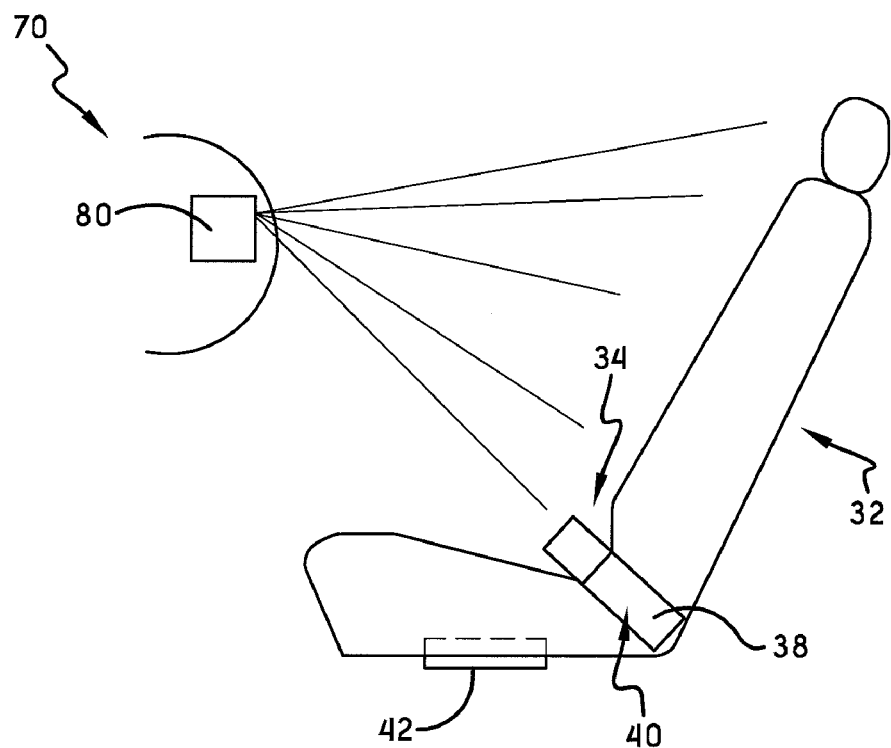
FIG. 8 is a side schematic view of a visual detection device.

With reference now to FIG. 8, the vehicle 10 may include an occupant detection system 70 for determining whether an occupant is in the seat 32. The occupant detection system 70 may determine that the seat 32 is occupied when the seat belt 34 is fastened and the seat belt switch 40 is closed. The occupant detection system 70 may determine that the seat 32 is occupied when the weight measurement device 42 measures a weight that is greater than or equal to a predetermined amount. The predetermined amount may be set such that an object or a child in the seat 32 would weigh less than the predetermined amount. The occupant detection system 70 may include a visual detection device 80. The visual detection device 80 may be a camera or a passive or active infrared sensor. The camera may be, for one non-limiting example, a device as disclosed in U.S. Pat. No. 7,363,123, application Ser. No. 11/048,512, titled APPARATUS FOR DETECTING PASSENGER OCCUPANCY OF VEHICLE, to Terauchi et al., incorporated by reference in its entirety. A passive infrared sensor (PIR) is an electronic device that can measure infrared (IR) light radiating from objects in its field of view, such as an occupant in the seat 32. An active infrared sensor can send out IR and measure the difference between the time the outbound IR pulses are sent and the time the inbound IR pulses are received. The occupant detection system 70 can use the information from one or more of these devices to determine whether the seat 32 is occupied.

With reference now to FIGS. 3-5 and 10, the door lock system 100 may have a control unit 101 for sensing the lock condition (locked or unlocked) of the doors 50 and determining which doors 50 to unlock. The control unit 101 may include an integrated circuit and may be mounted to the frame 12. The control unit 101 may have an input 102 for receiving the lock condition of doors 50 at a specified time or event. In one embodiment, the input 102 receives the lock condition of doors 50 when transmission shift lever 22 is moved out of park P, which changes the transmission 20 from the park position 24 to the moving position 26. The control unit 101 may have an output 104 for sending an unlock signal to the doors 50 at a specified time or event. In one embodiment, the output 104 sends the unlock signal to the doors 50 when transmission shift lever 22 is moved back into park P, which changes the transmission 20 from the moving position 26 to the park position 24. The control unit 101 may have a logic unit 106 for determining whether to send an unlock signal from the output 104 to the door 50 based upon the input 102.

Figure 10:
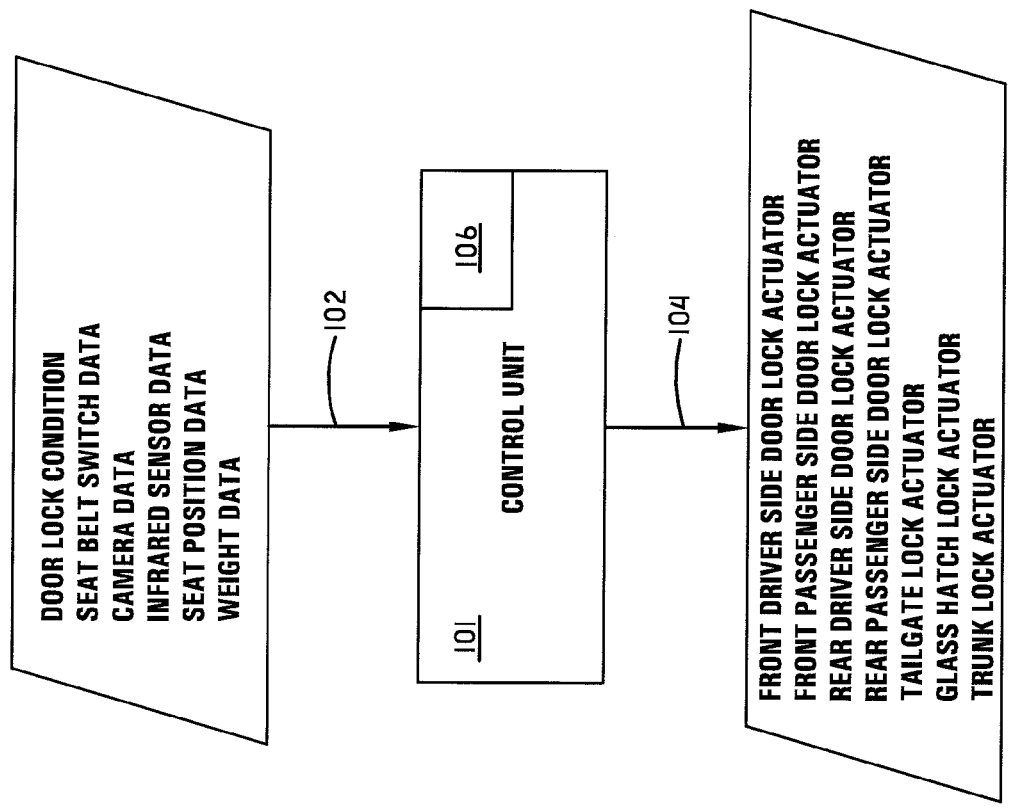
FIG. 10 is a flowchart for the control unit.
Figure 11:
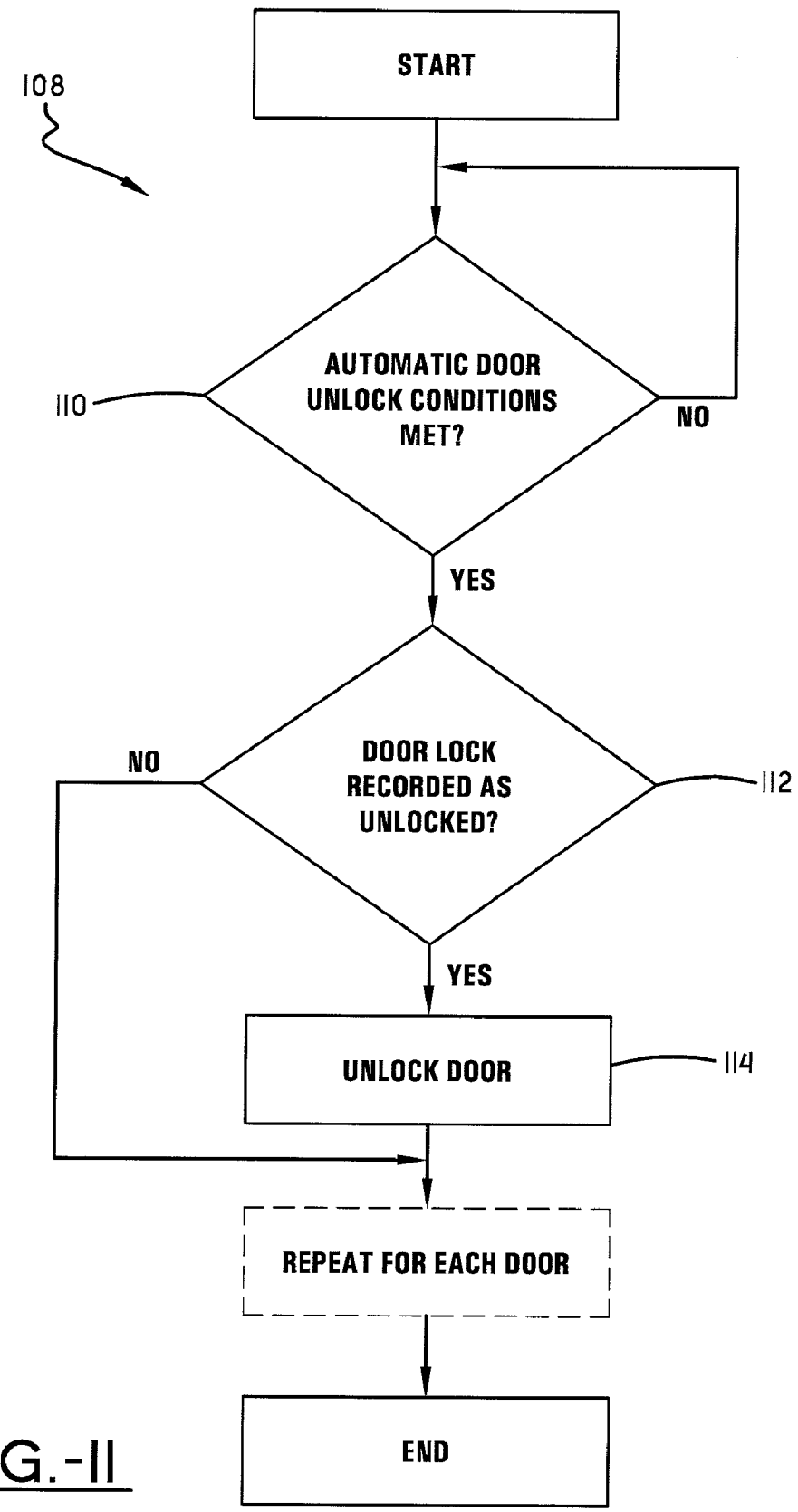
FIG. 11 is a flowchart for the logic of the control unit according to one embodiment of this invention.

With reference now to FIGS. 10 and 11, the logic 108 of the door lock system 100 according to one embodiment of this invention will now be described. The first decision point 110 is whether the automatic door unlock conditions are met. If the conditions are not met (No), then the logic 108 keeps rechecking this decision point 110. If the conditions are met (Yes), then the logic 108 moves to the second decision point 112 to determine whether the door 50 was previously recorded as being unlocked. If the door 50 was recorded as being unlocked (Yes), then the logic 108 moves to the door unlock process 114 and the door lock system 100 unlocks the door 50. If the door lock was not recorded as being unlocked (No), then the door lock system 100 leaves the door 50 locked. The logic 108 is repeated for each door 50 of the vehicle 10.

Figure 12:
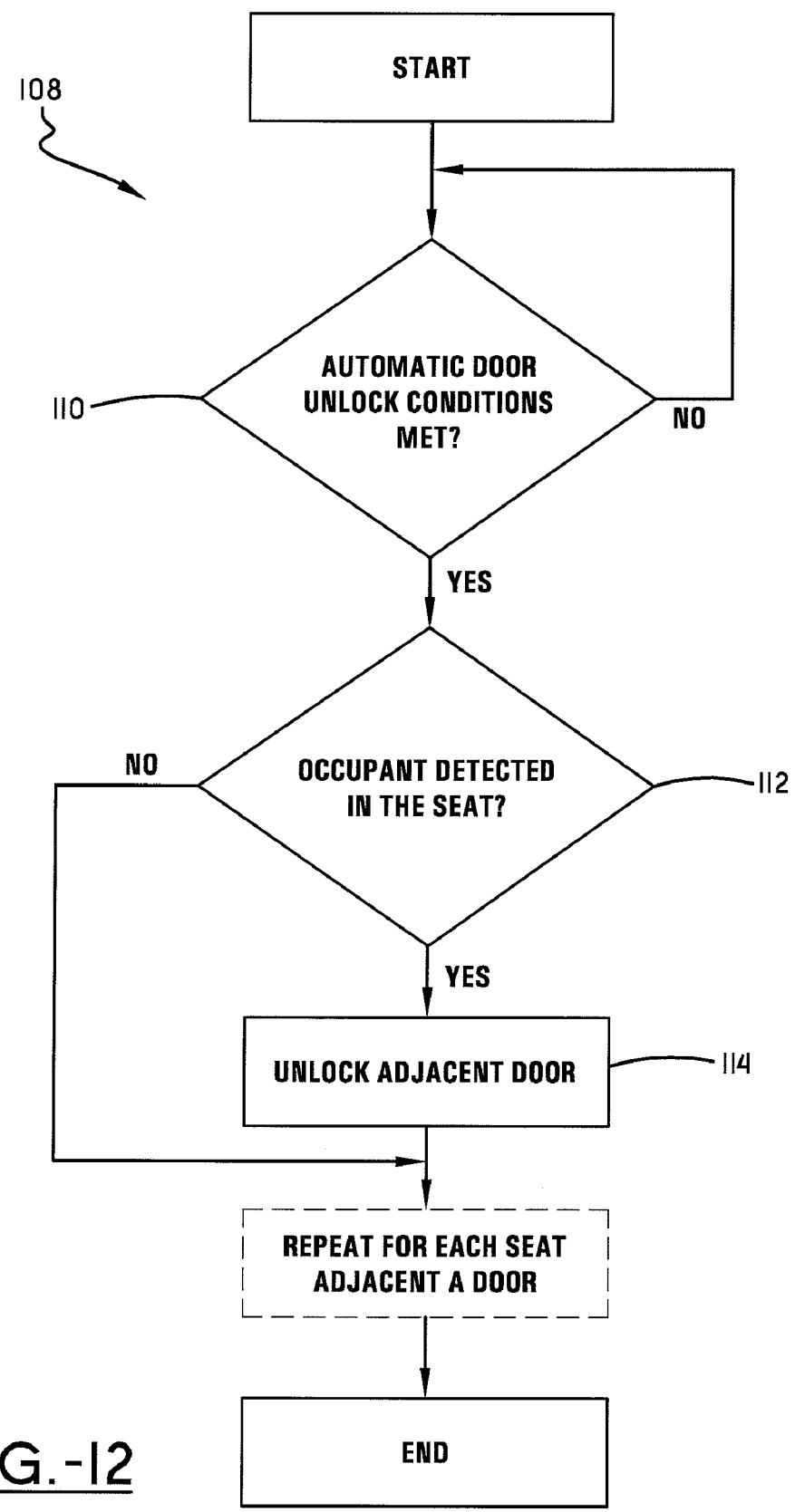
FIG. 12 is a flowchart for the logic of the control unit according to one embodiment of this invention.

With reference now to FIGS. 10 and 12, the logic 108 of the door lock system 100 according to one embodiment of this invention will now be described. The first decision point 110 is whether the automatic door unlock conditions are met. If the conditions 110 are not met (No), then the logic 108 keeps rechecking this decision point 110. If the conditions 110 are met (Yes), then the logic 108 moves to the second decision point 112 to determine whether an occupant is detected in the seat 32. If an occupant is detected in the seat 32 (Yes), then the logic 108 moves to the door unlock process 114 and the door lock system 100 unlocks the door 50. If an occupant is not detected in the seat 32 (No), or the occupant does meet the predetermined weight requirement (No), then the door lock system 100 leaves the door 50 locked. The logic 108 is repeated for each door 50 of the vehicle 10.

With reference now to all the FIGURES, the operation of the door lock system 100 will now be described. At a specified time or event, the control unit 101 receives the lock condition (locked or unlocked) of the doors 50 through the input 102 and records the lock condition for each door 50. In one embodiment, the specified event is when the transmission 20 is changed from the park position 24 to the moving position 26. In this embodiment, the control unit 101 receives the lock condition (locked or unlocked) of the doors 50 through the input 102 and records the lock condition for each door 50 when the transmission 20 is changed from the park position 24 to the moving position 26. For the vehicle 10 with the front driver side door 56, rear driver side door 57, front passenger side door 58, rear passenger side door 59, and rear hatch door 60, any combination of doors 50 could be unlocked. After the specified time or event, the control unit 101 may then lock all the doors 50. When the automatic door unlock condition is met, the control unit 101 sends out an unlock signal through the output 106 to the doors 50 that were recorded as being unlocked. In one embodiment, the automatic door unlock condition is when the transmission 20 is changed from the moving position 26 back to the park position 24. In this embodiment, the control unit 101 sends out an unlock signal through the output 106 to the doors 50 that were recorded as being unlocked. For example, both front doors 56, 58 could be unlocked, both rear doors 57, 59 could be locked, and the rear hatch door 60 could also be locked when the transmission is in the park position 24. When the transmission 20 is changed from the park position 24 to the moving position 26, the control unit 101 receives the lock condition (locked or unlocked) from each of the doors 56, 57, 58, 59, 60 through the input 102 and records the lock condition. The control unit 101 then locks all the doors 56, 57, 58, 59, 60. When the transmission 20 is changed from the moving position 26 back to the park position 24, the control unit 101 sends out an unlock signal through the output 106 to the doors 56, 58, which were recorded as being unlocked when the transmission 20 changed from the park position 24 to the moving position 26. The control unit 101 leaves doors 57, 59, 60 locked because these doors 50 were recorded as being locked when the transmission 20 changed from the park position 24 to the moving position 26.

With continuing reference to all the FIGURES, the control unit 101 may have an input 102 for receiving an occupancy status of each seat 32 (occupied or not occupied) from the occupant detection system 70. The control unit 101 may receive and record the occupancy status of the seats 32 at any time chosen by one with ordinary skill in the art. In one embodiment, the control unit 101 may record the occupancy status of the seats 32 when the transmission 20 is changed from the park position 24 to the moving position 26. In another embodiment, the control unit 101 may record the occupancy status of the seats 32 when the transmission 20 is changed from the moving position 26 to the park position 24. When the transmission 20 is changed from the moving position 26 back to the park position 24, the control unit 101 sends out an unlock signal through the output 106 to the door 50 adjacent each seat 32 recorded as being occupied. Any combination of seats 32 could be occupied. For example, if the front driver side seat 44 and the rear passenger side seat 47 were both recorded as being occupied, then the control unit 101 would send an unlock signal to the front driver side door 56 and the rear passenger side door 59 when the transmission 20 is changed from the moving position 26 back to the park position 24. The control unit 101 may receive (1) the lock condition of the doors 50 and (2) the occupancy status of each seat 32 adjacent a door 50 via the input 102. In one embodiment, the control unit 101 determines to send an unlock signal to the door 50 if (1) the door 50 was recorded as being unlocked and (2) the seat 32 adjacent the door 50 was recorded as being occupied.

Numerous embodiments have been described, hereinabove. It will be apparent to those skilled in the art that the above methods and apparatuses may incorporate changes and modifications without departing from the general scope of this invention. It is intended to include all such modifications and alterations in so far as they come within the scope of the appended claims or the equivalents thereof.

We claim:

1. A vehicle comprising:
a frame;
a locomotion source supported to the frame for use in providing locomotion for the vehicle;
a passenger door supported to the frame for access to a portion of an interior of the vehicle, the passenger door having a locked condition for prohibiting the passenger door from opening and an unlocked condition for allowing the passenger door to open;
a wheel supported to the frame;
a seat supported to the frame;
a transmission supported to the frame for operatively connecting the locomotion source to the wheel, the transmission comprising:
a park condition for maintaining the wheel in a parked condition; and,
a moving condition;
an occupant detection system mounted to the frame for determining whether the seat adjacent the passenger door is occupied; and,
a passenger door unlocking system comprising:
a control unit mounted to the frame having an integrated circuit which selectively unlocks the passenger door, the control unit for selectively unlocking the passenger door comprising:
an input which receives a signal from the occupant detection system when the transmission is shifted from the park condition;
a logic unit which determines whether to send an unlock signal to the passenger door based upon the input; and,
an output which selectively sends the unlock signal to the passenger door when the transmission is changed from the moving condition to the park condition;
wherein the logic unit determines to engage the output and sends the unlock signal to the passenger door only if the input has received the signal that corresponds to the seat being occupied from the occupant detect system when the transmission was shifted from the park condition.

2. The vehicle in claim 1, wherein the seat comprises a seat belt and a seat belt switch, and wherein the occupant detection system determines that the seat is occupied when the seat belt is fastened and the seat belt switch is closed.

3. The vehicle in claim 1, wherein the occupant detection system comprises a visual detection device, wherein the occupant detection system determines that a seat is occupied when the visual detection device observes an occupant in the seat.

4. The vehicle in claim 3, wherein the visual detection device comprises a camera for observing whether an occupant is in the seat.

5. The vehicle in claim 3, wherein the visual detection device comprises a passive infrared sensor for observing whether an occupant is in the seat.

6. The vehicle in claim 1, wherein the occupant detection system comprises a weight detection device, wherein the occupant detection system determines that a seat is occupied when the weight detection device measures an occupant in the seat.

7. A method of operating a locking system for a vehicle, the vehicle comprising a transmission having a park condition and a moving condition, a door having a lock, and a seat positioned adjacent the at least one door, the method comprising the steps of:
  detecting an occupancy condition of the seat;
  detecting the locked condition of the lock when the transmission is moved from the park condition;
  locking the door while the transmission is placed in the moving condition; and
  determining whether to unlock the lock when the transmission is moved back to the park condition based on the occupancy condition of the seat and the condition of the lock when the transmission was moved from the park condition, wherein the step of determining whether to unlock the lock determines to unlock the lock only when the occupancy condition of the seat is occupied and the door was unlocked when the transmission was moved from the park condition;
  wherein an occupant detection system mounted to the frame detects the occupancy condition of the seat; and,
  wherein a control unit having an integrated circuit mounted to the frame detects the locked condition of the lock and determines whether to unlock the lock.

8. The method of claim 7 further comprising the step of:
  unlocking the at least one door when the transmission is moved back to the park condition.

9. The method of claim 7, wherein the step of detecting an occupancy condition of the seat detects the occupancy condition when the transmission is moved from the park condition.

10. The method of claim 7, wherein the step of detecting an occupancy condition of the seat detects the occupancy condition when the transmission is moved back to the park condition.

11. The method of claim 7, wherein the step of detecting an occupancy condition of the seat detects that the seat is occupied when the seat belt switch is closed.

12. The method of claim 7, wherein the step of detecting an occupancy condition of the seat detects that the seat is occupied when a visual detection device observes an occupant in the seat.

13. The method of claim 7, wherein the step of detecting an occupancy condition of the seat detects that the seat is occupied when a weight detection device measures an occupant in the seat.

14. A vehicle comprising:
  a frame;
  a locomotion source supported to the frame for use in providing locomotion for the vehicle;
  a passenger door supported to the frame for access to a portion of an interior of the vehicle, the passenger door having a locked condition for prohibiting the passenger door from opening and an unlocked condition for allowing the passenger door to open;
  a wheel supported to the frame;
  a seat supported to the frame;
  a transmission supported to the frame for operatively connecting the locomotion source to the wheel, the transmission comprising:
    a park condition for maintaining the wheel in a parked condition; and,
    a moving condition; and,
  a passenger door unlocking system comprising:
    a control unit mounted to the frame and having an integrated circuit which selectively unlocks the passenger door, the control unit for selectively unlocking the passenger door comprising:
      an input which receives a signal from the passenger door identifying whether the passenger door is in the locked condition or the unlocked condition when the transmission is changed from the park condition to the moving condition;
      a logic unit which determines whether to send an unlock signal to the passenger door based upon the input; and,
      an output which selectively sends the unlock signal to the passenger door when the transmission is changed from the moving condition to the park condition
  wherein the logic unit determines to engage the output and sends the unlock signal to the passenger door only if the input has received the signal that corresponds to the seat being occupied from the occupant detect system when the transmission was shifted from the park condition.

15. The vehicle in claim 14 further comprising:
  a front driver side passenger door;
  a rear driver side passenger door;
  a front passenger side passenger door;
  a rear passenger side passenger door;
  wherein the input receives a signal from (1) the front driver side passenger door identifying that the passenger door is in the unlocked condition, (2) the rear driver side passenger door identifying that the passenger door is in the locked condition, (3) the front passenger side passenger door identifying that the passenger door is in the unlocked condition, and (4) the rear passenger side passenger door identifying that the passenger door is in the locked condition;
  wherein the logic unit determines to send the unlock signal to the front driver side passenger door and the front passenger side passenger door;
  wherein the output sends the lock signal to all the passenger doors when the transmission is changed from the park condition to the moving condition; and,
  wherein the output sends the unlock signal to the driver side front passenger door and the passenger side front passenger door when the transmission is changed from the moving condition to the park condition.

16. The vehicle in claim 15 further comprising:
  a rear hatch door;
  wherein the input receives a signal from the rear hatch door identifying that the rear hatch door is in the unlocked condition;
  wherein the logic unit determines to send the unlock signal to the rear hatch door;
  wherein the output sends the lock signal to all the doors when the transmission is changed from the park condition to the moving condition; and,
  wherein the output sends the unlock signal to the rear hatch door when the transmission is changed from the moving condition to the park condition.

* * * * *